(12) United States Patent
Dou

(10) Patent No.: US 6,532,826 B1
(45) Date of Patent: Mar. 18, 2003

(54) MEASURING DEVICE FOR THE GAS-LIQUID FLOW RATE OF MULTIPHASE FLUIDS

(75) Inventor: Jianwen Dou, Gansu (CN)

(73) Assignee: Lanzhou, Haimo Technologies, Inc., Lanzhou (CN)

(*) Notice: Subject to any disclaimer, the term of this patent is extended or adjusted under 35 U.S.C. 154(b) by 0 days.

(21) Appl. No.: 09/744,742

(22) PCT Filed: Apr. 1, 1999

(86) PCT No.: PCT/CN99/00043

§ 371 (c)(1),
(2), (4) Date: Mar. 26, 2001

(87) PCT Pub. No.: WO00/06974

PCT Pub. Date: Feb. 10, 2000

(30) Foreign Application Priority Data

Jul. 28, 1998 (CN) .................................... 98217706 U (51) Int. Cl.[7] .................................................. G01F 1/74
(52) U.S. Cl. ............................................... 73/861.04
(58) Field of Search ........................... 73/861.04, 195, 73/200, 61.44, 38; 60/426; 62/498; 137/89; 702/50; 166/352.1

(56) References Cited

U.S. PATENT DOCUMENTS

| | | | | |
|---|---|---|---|---|
| 4,396,063 A | * | 8/1983 | Godbey ...................... | 166/250 |
| 4,574,827 A | * | 3/1986 | Konak ......................... | 137/89 |
| 4,574,837 A | * | 3/1986 | Aggout et al. .............. | 137/561 |
| 5,051,922 A | | 9/1991 | Toral et al. | |
| 5,127,272 A | | 7/1992 | Dean et al. | |
| 5,182,909 A | * | 2/1993 | Stellwagon ................. | 60/426 |
| 5,390,547 A | | 2/1995 | Liu | |
| 5,570,744 A | * | 11/1996 | Weingarten et al. ........ | 166/357 |
| 5,589,642 A | | 12/1996 | Agar et al. | |
| 5,597,961 A | | 1/1997 | Marrelli | |
| 6,089,039 A | * | 7/2000 | Yamauchi ................... | 62/498 |
| 6,128,962 A | * | 10/2000 | Marrelli et al. ............ | 73/861.04 |
| 6,234,030 B1 | * | 5/2001 | Butler ........................ | 73/861.04 |

FOREIGN PATENT DOCUMENTS

| | | |
|---|---|---|
| CN | 1182873 A | 5/1998 |
| CN | 2293799 Y | 10/1998 |
| CN | 2311758 Y | 3/1999 |
| EP | 0 493 886 A1 | 11/1991 |
| EP | 0 738 880 A2 | 11/1993 |
| EP | 0 684 458 A2 | 5/1995 |
| EP | 0 690 292 A2 | 6/1995 |

OTHER PUBLICATIONS

Abstract and First Claim of Chinese Patent No. ZL 97229522.4 , Jianwen.*
Abstract and First Claim of Chinese Patent No. ZL 97229522.4 (discussed in the Background portion of this application's specification on p. 1).

* cited by examiner

Primary Examiner—Hezron Williams
Assistant Examiner—Jewel V. Thompson
(74) Attorney, Agent, or Firm—Harness, Dickey & Pierce, PLC (57) ABSTRACT

The invention is a kind of measuring device for the gas-liquid flow rate of multiphase fluids. The device includes a means for generating static slug flow and a means for measuring the flow rate by cross-correlation. These means are mounted on the pipe through which the multiphase fluids such as gas liquid flow. The device includes a multiphase fluid regulating means and a multiphase fluid fraction measuring means. These means are mounted on the pipe through which the multiphase fluids such as gas liquid flow by cross-correlation orderly. Said multiphase fluid regulating means lies in the downstream of said measuring means or said multiphase fluid fractions measuring means lies in the upstream of said generating means for static slug flow. The device also includes a means for data acquisition and data procession. The means is used for acquiring and processing the measuring data. The flow rate of each fraction is calculated from the multiphase fluid fractions measuring means and the measuring means for the flow rate by cross-correlation.

17 Claims, 7 Drawing Sheets

MEASURING DEVICE FOR THE GAS-LIQUID FLOW RATE OF MULTIPHASE FLUIDS

This is a National Phase of PCT/CN99/00043, the disclosure of which is hereby incorporated by reference.

FIELD OF THE INVENTION

The present invention, belonging to the field of multiphase flow metering, relates to an apparatus for measuring flow rates of individual phases of a gas/liquid multiphase flow typically such as an oil/gas water three phase flow in oil and gas industry.

BACKGROUND OF THE INVENTION

Multiphase flow metering has been regarded as one of the critical technologies to determine the success of oil and gas industry in the future. Great advances have been made in R&D of multiphase flow metering over the recent years, but most of prior-art multiphase flow metering over the recent years, but most of prior-art multiphase flow meters are able to measure only one or a small number of flow patterns due to the complexity and stochastic process of the multiphase flow. Therefore, one of the technical difficulties in the field of multiphase flow metering is how to effectively condition and control flow patterns of the multiphase flow. Referring to the prior-art technologies, one example is disclosed in Chinese Patent No. ZL 97229522.4 that provides a technical solution for conditioning flow patterns and measuring flow rates of the gas/liquid multiphase flow. Products based on the above-mentioned patent have also been extensively used in oil and gas production procedure in some onshore oilfields. However, the above-mentioned apparatus comprises some moving components and is not suitable for un-manned applications in offshore, desert, and marginal fields. For these un-manned applications reliability of the apparatus is more important than any other technical requirements, and it is the first factor considered by the users. Thus R&D for multiphase flow metering technologies without moving components and applicable for various flow patterns is currently one of the most important challenges in the field of multiphase flow technology.

SUMMARY OF THE INVENTION

The object of the present invention is to provide a multiphase flow metering apparatus that is suitable for unmanned application.

For achieving the above-mentioned object the present invention provides an apparatus for measuring flow rates of individual phases of the multiphase flow, mounted on a flow pipe, comprising: static means for generating slug flow and a cross correlation type flow meter successively mounted on said flow pipe; means for conditioning multiphase flow and means for measuring phase fractions of multiphase flow successively mounted on said flow pipe; wherein said means for conditioning multiphase flow locates downstream of said cross correlation type flow meter, or said means for measuring phase fractions locates upstream of said static means for generating slug flow; and data acquisition and processing means for collecting dada from said cross correlation type flow meter and said means for measuring phase fractions and carrying out calculation of flow rates of individual phases of the multiphase flow.

Additionally, the apparatus may also comprise a throttle type flow meter located downstream of said means for conditioning multiphase flow and adjacent to said means for measuring phase fractions, and a device for measuring temperature and a device for measuring pressure separately mounted on said flow pipe.

Features of the apparatus according to the present invention include compact structure, less pressure loss, and especially without moving components so as to prevent the apparatus itself from mechanical troubles. The apparatus can operate reliably over a long period of time thus being suitable for un-manned applications in the offshore, desert, and marginal fields. Moreover, the apparatus is able to measure various multiphase flow patterns with high accuracy and wide operating envelope.

BRIEF DESCRIPTION OF THE DRAWINGS

Other aspects, objects, and advantages of the present invention will become more apparent in light of the detailed description below regarding the preferred embodiments in combination with the attached drawings.

DESCRIPTION OF THE PREFERRED EMBODIMENTS

Figure 1:
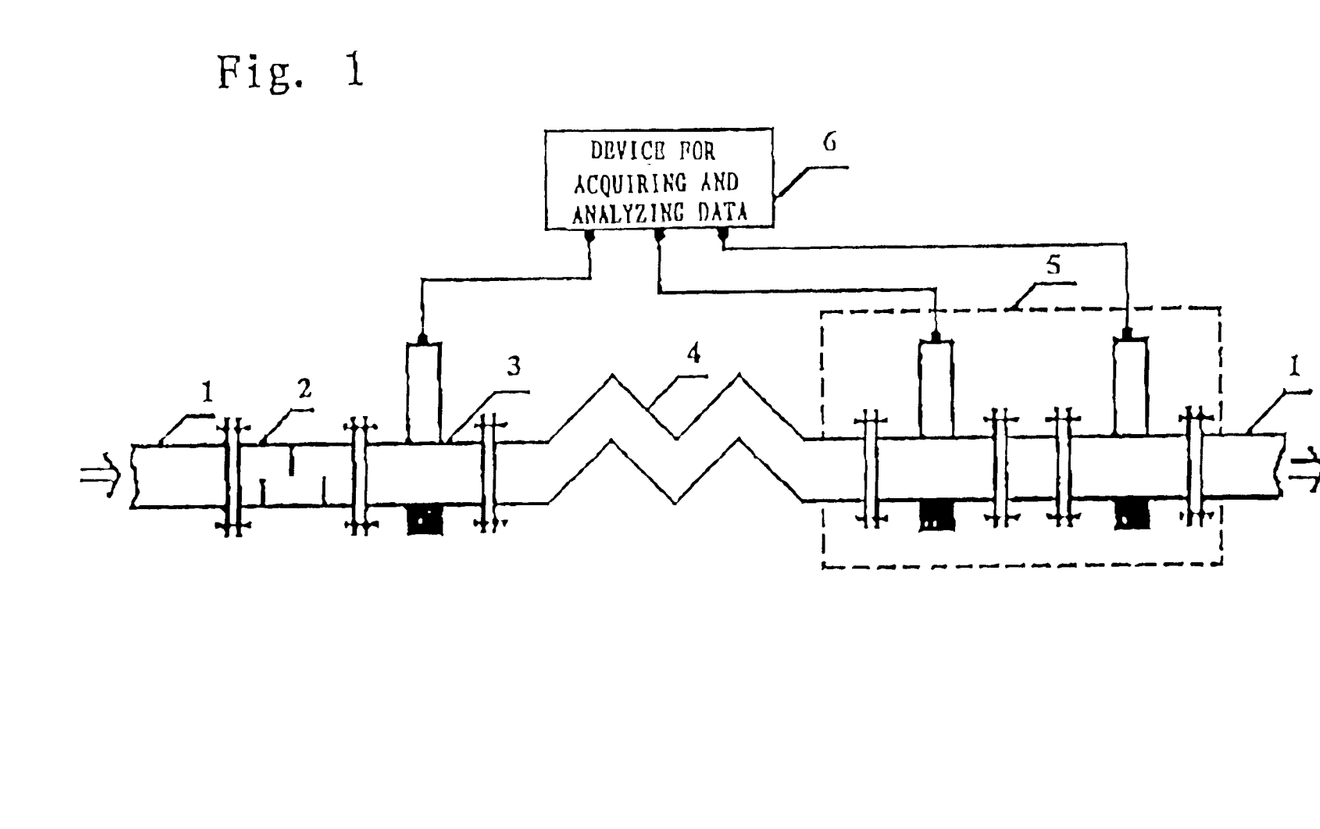
FIG. 1 depicts a first exemplary embodiment of the invention.

Referring to FIG. 1, an exemplary embodiment of the invention illustratively includes a static mixing device 2, a means for measuring phase fractions 3, static means for generating slug flow 4, and a cross correlation type flow meter 5, which are successively mounted on a flow pipe 1, and means 6 for acquiring and analyzing data from said means for measuring phase fractions and said cross correlation type flow meter so as to calculate flow rates of individual phases of the multiphase flow. For example, in case of measuring oil/gas/water three-phase flow, said means for measuring phase fractions 3 determines phase fractions of oil, gas, and water separately as $f_o$, $f_g$, and $f_w$ while said cross correlation type flow meter 5 measures total flow rate of the oil/gas water three-phase flow. Therefore, flow rates of individual oil, gas, and water phases as $Q_o$, $Q_g$, and $Q_w$ may be obtained based on the following equations.

$$Q_o = Q \times f_o \quad (1)$$

$$Q_g = Q \times f_g \quad (2)$$

$$Q_w = Q \times f_w \quad (3)$$

In this exemplary embodiment, said static mixing device 2, mounted upstream of said means for measuring phase fractions 3, mixes the gas/liquid multiphase flow to effectively eliminate slip between gas and liquid phases and non-homogeneous distribution of phase at the measurement section so as to greatly improve measurement accuracy and representation for the phase fractions; said static means for generating slug flow 4, mounted upstream of said cross correlation type flow meter 5, could generate preferred slug flow pattern for cross correlation measurement so as to improve operating envelope and measurement accuracy of said cross correlation type flow meter 5. Note that said means for measuring phase fractions 3 must be mounted at a position downstream of and immediately adjacent to said static mixing device 2, and said cross correlation type flow meter 5 must be mounted at a position downstream of and immediately adjacent to said static means for generating slug flow 4, while said static mixing device may be mounted either upstream of or downstream of said static means for generating slug flow 4.

Also note that apparatus in this exemplary embodiment may comprise a throttle type flow meter (not illustrated in FIG. 1), mounted at a position on said flow pipe downstream of said static mixing device 2 and adjacent to said means for measuring phase fractions, as a supplementary metering device which is helpful for improving measurement accuracy and operating envelope.

Figure 2:
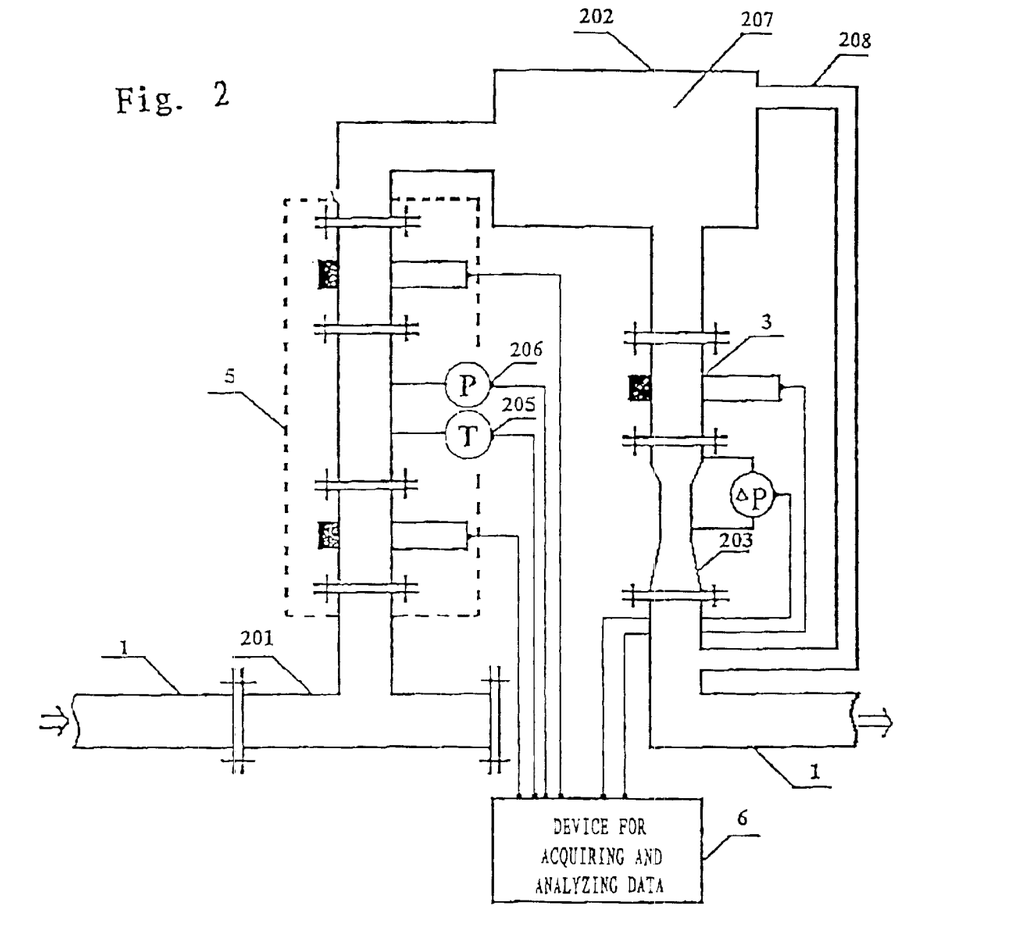
FIG. 2 depicts another exemplary embodiment of the invention.

Referring to FIG. 2, another exemplary embodiment of the invention illustratively includes a static means for generating slug flow 201, a cross correlation type flow meter 5, a static flow diverter 202, a means for measuring phase fractions 3, and a throttle type flow meter 203, which are successively mounted on a flow pipe 1, and a temperature transmitter 205 and a pressure transmitter 206 separately mounted on the flow pipe at positions between upstream and downstream sensors of said cross correlation type flow meter 5, and means 6 for acquiring and processing signals from said cross correlation type flow meter 5, said means for measuring phase fractions 3, said throttle type flow meter 203, said temperature transmitter 205, and said pressure transmitter 206 and outputting measurement results.

Referring to FIG. 2, said static flow diverter 202 comprises a buffer 207 and a bypass 208; said buffer 207 has a inlet, a outlet, and a bypass-outlet, and said outlet locates a lower position than those of inlet and bypass-outlet; inlet and outlet of said buffer 207 are connected to said flow pipe 204; one end of said bypass 208 is connected to said bypass-outlet of buffer while the other end of said bypass 208 is connected to said flow pipe 1 at a position downstream of said means for measuring phase fractions 3 and said throttle type flow meter 203. By the use of said static flow diverter 202 most free gas could be diverted into said bypass 208 so that gas volume fraction of multiphase flow through said means for measuring phase fractions 3 and said throttle type flow meter 203 keeps relatively low thus improving measurement accuracies of liquid phase flow rate and fraction.

In this exemplary embodiment total flow rate of the gas/liquid multiphase flow is measured by said cross correlation type flow meter 5, and flow rates of individual phases in the liquid mixture are determined by said means for measuring phase fractions 3 and said throttle type flow meter 203, and gas flow rate may be obtained by deducting gross liquid flow rate from total flow rate. Additionally, by the use of said temperature and pressure transmitters temperature and pressure of the multiphase flow are measured, and this makes it possible to convert flow rates at actual conditions into those at standard conditions.

Again note that said means for measuring phase fractions 3 and said throttle type flow meter 203 must locate at positions downstream of and immediately adjacent to said static flow diverter 202; said cross correlation type flow meter 5 must locate at positions downstream of and immediately adjacent to said static means for generating slug flow 201; said static flow diverter 202 may locate at a position either upstream of or downstream of said static means for generating slug flow 201.

It needs further describing that installation of said throttle type flow meter 203 could improve measurement results at high gas volume fraction condition, but this is not a must. Normally even if without said throttle type flow meter 203 the other components could still form a complete set of apparatus for measuring multiphase flow rates. At such a situation said means for acquiring and processing data 6 calculates total flow rate Q based on measurement data from said cross correlation type flow meter 5, and calculates phase fractions of individual phases $F_i$ (subscript i represents individual phase) based on measurement data from said means for measuring phase fractions 3 and upstream and downstream sensors of said cross correlation type flow meter 5. Finally flow rates of individual phases of the gas/liquid multiphase flow are determined based on the following equations.

$$Q_i = Q \times f_i \tag{4}$$

Various embodiments of said static means for generating slug flow used by this present invention are given below.

Figure 3:
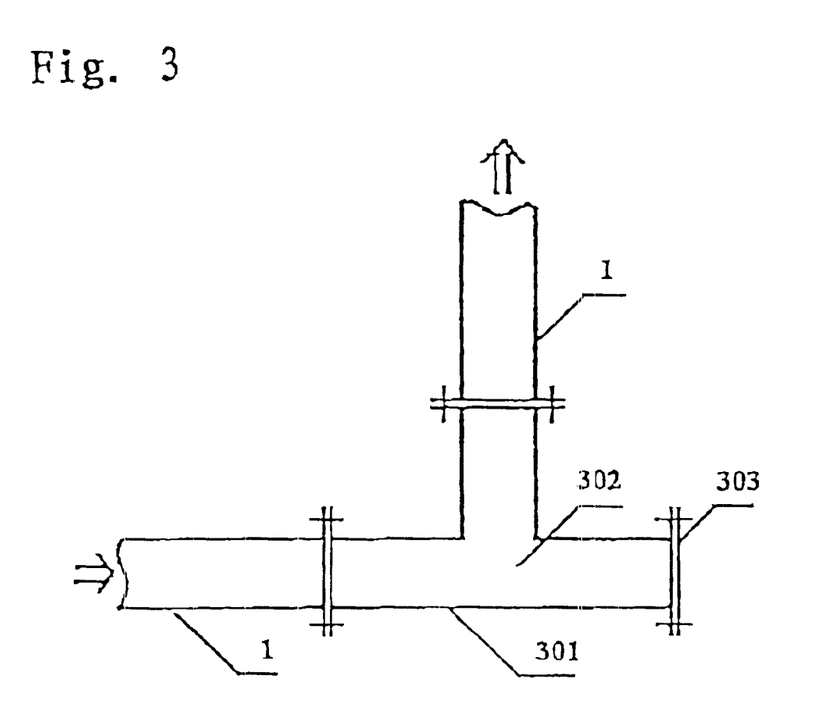
FIGS. 3–7 depict various exemplary embodiments of the static means for generating slug flow for use by the present invention.
Figure 4:
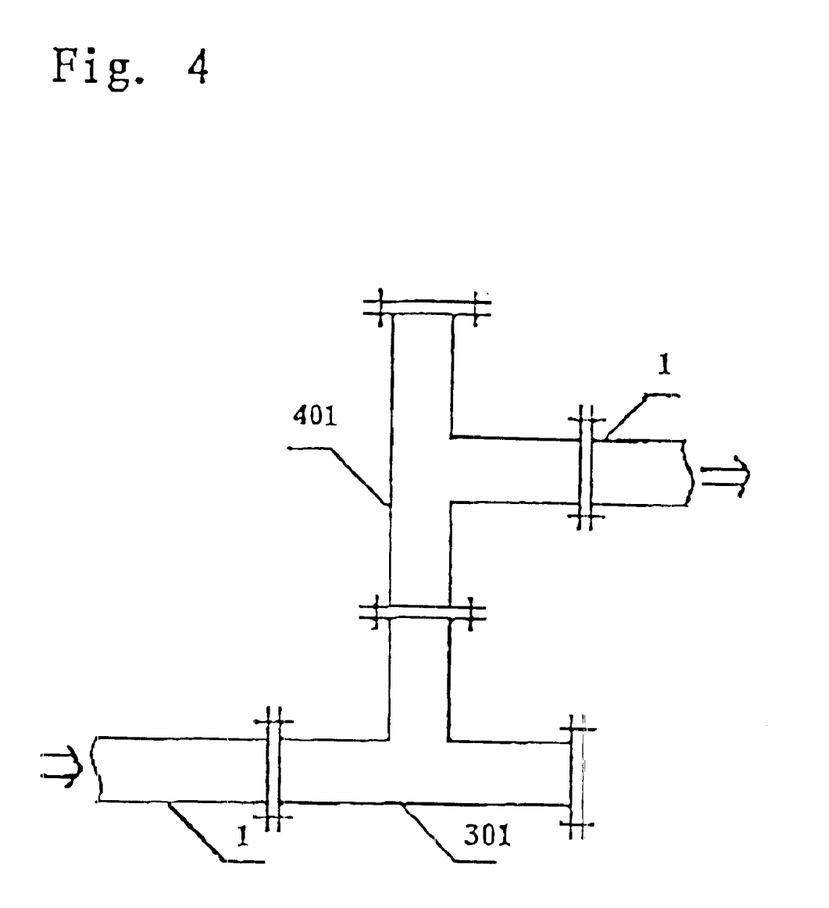

Static means for generating slug flow used by this present invention may consist of one or more blind tees. Referring to FIG. 3, a blind tee 301 is mounted on said flow pipe 1 as a static means for generating slug flow. Said blind tee 301 includes a tee tube 302 and a blind flange 303. Inlet and outlet of said blind tee 301 are separately connected to said flow pipe 1, and said blind flange is mounted on the blind-let of said blind tee 301. Referring to FIG. 4, a first blind tee 301 and a second blind tee 401 are mounted successively on said flow pipe 1 to form a static means for generating slug flow with better performance.

Figure 5:
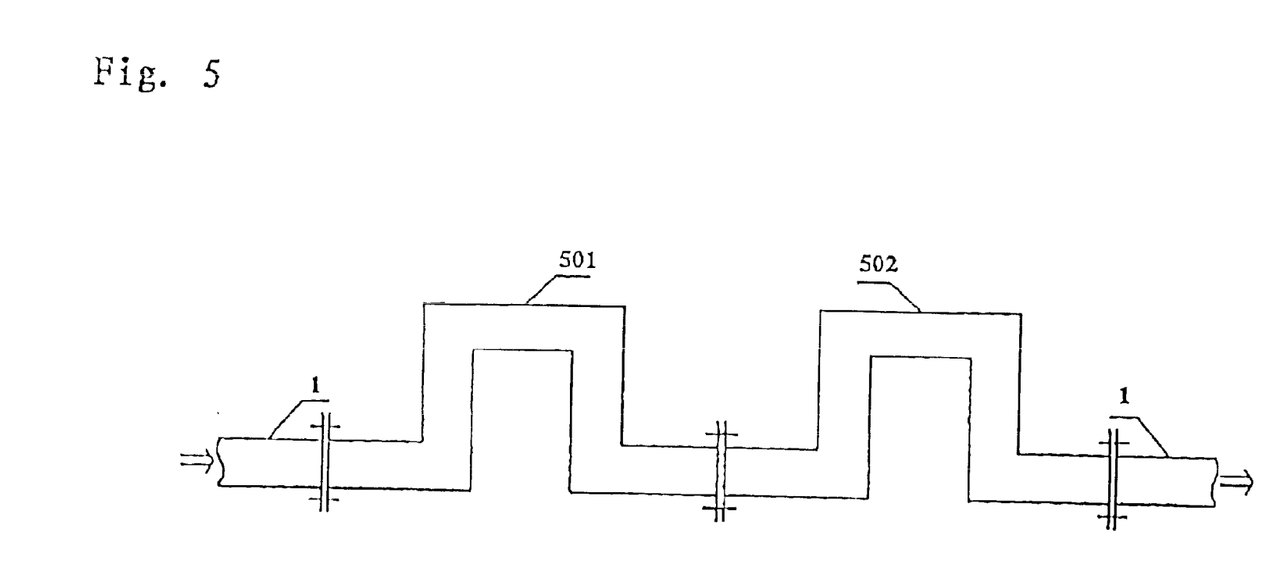

Static means for generating slug flow for use in this invention may also consist of one or more reverted U tubes. Referring to FIG. 5, a first reverted U tube 501 and a second reverted U tube 502 are mounted successively on said flow pipe to form a static means for generating slug flow with better performance.

Figure 6:
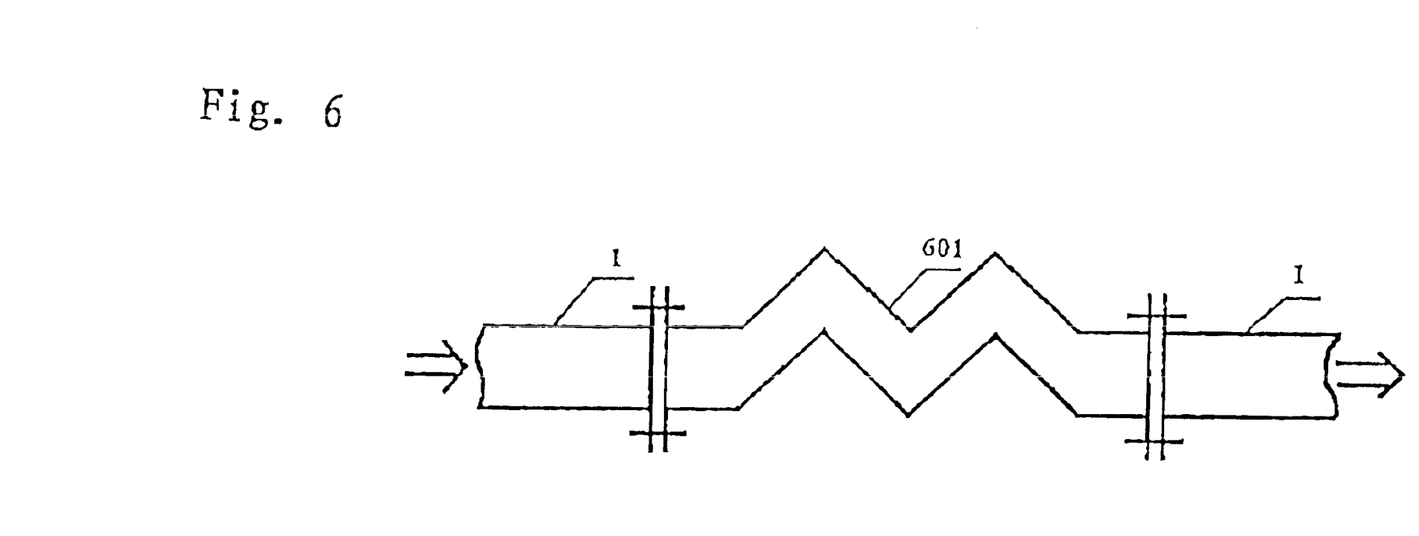

Static means for generating slug flow for use in this invention may also consist of one or more folding pipe sections. Referring to FIG. 6, a folding pipe section 601 is mounted on said flow pipe to form a static means for generating slug flow.

Figure 7:
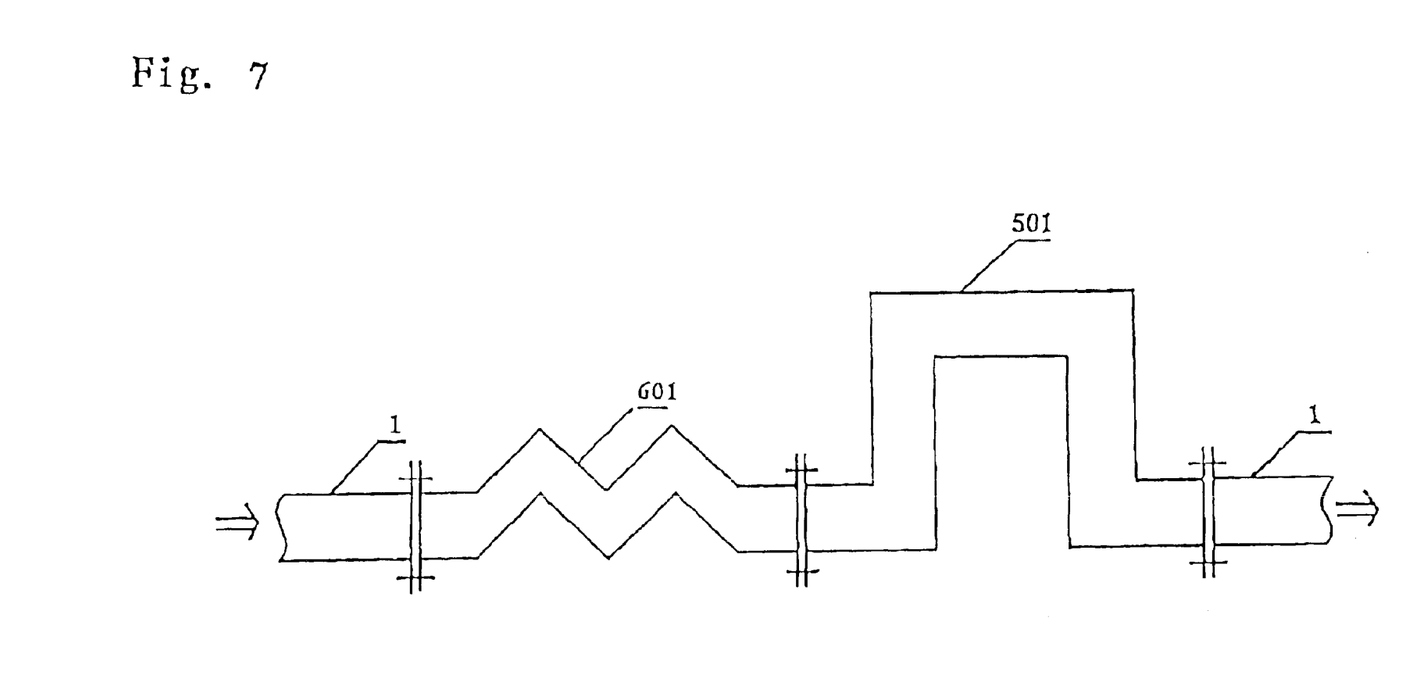

Static means for generating slug flow for use in this invention may also be formed by a combination of any one or more from blind tees, folding pipe sections, and reverted U tubes. Referring to FIG. 7, a folding pipe section 601 and a reverted U tube 501 are successively mounted on said flow pipe 1 to form a static means for generating slug flow with better performance.

The present inventor carried out testing of an apparatus for measuring multiphase flow rates according to this invention, which was mounted on a horizontal flow-line with internal diameter of 50 mm, and mixture of diesel, air and water was used. Referring to FIG. 2, said flow pipe is a seamless steel tube with diameter of 50 mm, connected by flanges to a gas/liquid multiphase flow loop (not illustrated). Said cross correlation type flow meter 5 consists of two single gamma ray sensors successively mounted on said flow pipe 1. A dual energy gamma sensor serves as said means for measuring phase fractions 3. A Venturi tube serves as said throttle type flow meter. A Pt-resistance temperature transmitter and a piczoresistive pressure transmitter separately serve as temperature and pressure measurement devices 205 and 206. Said buffer 207 is a seamless steel tube with internal diameter of 150 mm, and said bypass 208 is a seamless steel tube with internal diameter of 30 mm. Said means for acquiring and processing data 6 consists of a industrial PC and PC-based interface cards for counting and A/D conversion. During the above-mentioned testing water cut of the liquid varied from 0 to 100% while Gas volume fraction varied from 10% to 90%, and test results showed that the apparatus according to this invention could be used for measuring various flow patterns such as bubble, slug, stratified, and annular flows, and the accuracies over the above measuring range was fine.

It should be noted that the above-mentioned preferred embodiments are only used for describing the present invention instead of constituting limitation of the present invention.

While the foregoing has described and exemplified aspects of various embodiments of the present invention, those skilled in the art will recognize that alternative elements and techniques, and/or combinations and permutations of the described elements and techniques can be substituted for, or add to, the embodiments described herein. Therefore, the scope of the present invention is only defined by the claims attached.

What is claimed is:

1. An apparatus for measuring flow rates of individual phases in a gas/liquid multiphase flow through a flow pipe, said apparatus comprising:

static means for generating slug flow within said flow pipe;

a cross correlation type flow meter for measuring a total flow rate of said gas/liquid multiphase flow through said flow pipe, said cross correlation type flow meter being located down stream of and adjacent to said static means for generating slug flow in a flow direction, means for conditioning multiphase flow within said flow pipe;

means for measuring actual phase fractions of said multiphase flow within said flow pipe, said means for measuring actual phase fractions being located down stream of an adjacent to said means for conditioning multiphase flow; and data acquisition and processing means in communication with said cross correlation type flow meter and said means for measuring actual phase fractions for collecting data therefrom and carrying out calculations for flow rates of individual phases of said gas/liquid multiphase flow.

2. The apparatus of claim 1 further comprising a throttle type flow meter located downstream of said means for conditioning multiphase flow and adjacent to said means for measuring actual phase fractions.

3. The apparatus of claim 1 further comprising a device for measuring temperature and a device for measuring pressure separately mounted on said flow pipe.

4. The apparatus of claim 3 wherein said means for conditioning multiphase flow is a static multiphase flow diverter.

5. The apparatus of claim 4 wherein said static multiphase flow diverter comprises a buffer and a bypass; said buffer having an inlet, an outlet, and bypass-outlet, said outlet being located at a lower position than said inlet and said bypass-outlet; said inlet and said outlet of said buffer being connected to said flow pipe; one end of said bypass being connected to said bypass-outlet of said buffer while the other end of said bypass is connected to said flow pipe at a position downstream of said means for measuring actual of phase fractions.

6. The apparatus of claim 5 wherein a diameter of said buffer of said static multiphase flow diverter is larger than either that of said flow pipe or that of said bypass of said static multiphase flow diverter.

7. The apparatus of claim 1 wherein said static means for generating slug flow comprises at least one blind tee.

8. The apparatus of claim 7 wherein said at least one blind tee consists of a tee tube and a blind flange; said tee tube having a inlet, a outlet, and a blind-let; said blind flange being fixed on said blind-let.

9. The apparatus of claim 1 wherein said static means for generating slug flow comprises at least one inverted U pipe.

10. The apparatus of claim 1 wherein said static means for generating slug flow comprises an at least one folding pipe section.

11. The apparatus of claim 1 said means for conditioning multiphase flow is a static mixing device.

12. The apparatus of claim 1 wherein said means for conditioning multiphase flow is a static multiphase flow diverter.

13. The apparatus of claim 12 wherein said static multiphase flow diverter comprises a buffer and a bypass; said buffer having an inlet an outlet, and a bypass-outlet, said outlet being located at a lower position than said inlet and said bypass-outlet; said inlet and said outlet of said buffer being connected to said flow pipe; one end of said bypass being connected to said bypass-outlet of said buffer while the other end of said bypass is connected to said flow pipe at a position downstream of said means for measuring phase fractions.

14. The apparatus of claim 13 wherein a diameter of said buffer of said static multiphase flow diverter is larger than either that of said flow pipe or that of said bypass of said static multiphase flow diverter.

15. The apparatus of claim 1 wherein said apparatus does not include a moving component.

16. The apparatus of claim 1 wherein said means for measuring actual phase fractions and said means for conditioning multiphase flow are located downstream of said cross correlation type flow meter in said flow direction.

17. The apparatus of claim 1 wherein said means for measuring actual phase fractions and said means for conditioning multiphase flow are located upstream of said cross correlation type flow meter in said flow direction.

* * * * *